United States Patent [19]
Martelli

[11] Patent Number: 5,871,196
[45] Date of Patent: Feb. 16, 1999

[54] SWIVELLING, QUICK-LOCKING FISHING-ROD HOLDER

[75] Inventor: Massimo Martelli, Rome, Italy

[73] Assignee: Studio Ferrario, Rome, Italy

[21] Appl. No.: 727,306

[22] Filed: Oct. 8, 1996

[30] Foreign Application Priority Data

Oct. 9, 1995 [IT] Italy .............................. RM950219 U

[51] Int. Cl.⁶ .................................................. F16M 13/00
[52] U.S. Cl. ............................ 248/514; 248/515; 43/21.2
[58] Field of Search .................................... 248/514, 515, 248/520, 521, 535, 538, 223.41, 224.51, 224.61, 289.11; 43/21.2

[56] References Cited

U.S. PATENT DOCUMENTS

| | | | |
|---|---|---|---|
| 2,594,227 | 4/1952 | Smith | 3/2 |
| 3,008,259 | 11/1961 | Zornes | 43/43.12 |
| 3,063,668 | 11/1962 | Yohe | 248/538 |
| 3,162,408 | 12/1964 | Markman | 248/515 |
| 3,977,637 | 8/1976 | Newton | 248/514 |
| 4,093,171 | 6/1978 | Mengo | 248/515 |
| 4,176,580 | 12/1979 | Gallegos | 84/327 |
| 4,551,939 | 11/1985 | Kitchens | 43/21.2 |
| 4,912,349 | 3/1990 | Chang | 310/50 |
| 4,987,817 | 1/1991 | Diaz | 84/421 |
| 5,054,737 | 10/1991 | DeLancey | 248/515 |
| 5,062,179 | 11/1991 | Huang | 16/111 R |
| 5,438,789 | 8/1995 | Emory | 248/514 |
| 5,588,630 | 12/1996 | Chen-Chao | 248/514 |
| 5,739,447 | 4/1998 | Hoshino | 84/402 |
| 5,756,912 | 5/1998 | Liao | 84/421 |

*Primary Examiner*—Ramon O. Ramirez
*Assistant Examiner*—Gwendolyn W. Baxter
*Attorney, Agent, or Firm*—Stevens, Davis, Miller & Mosher, L.L.P.

[57] ABSTRACT

A fishing-rod holder for trolling which is formed of an anchor plate forming a dovetail joint with a plate supporting a cylindrical fishing-rod holder. The position of the cylindrical fishing-rod holder being adjustable and quickly lockable according to one or more planes.

13 Claims, 4 Drawing Sheets

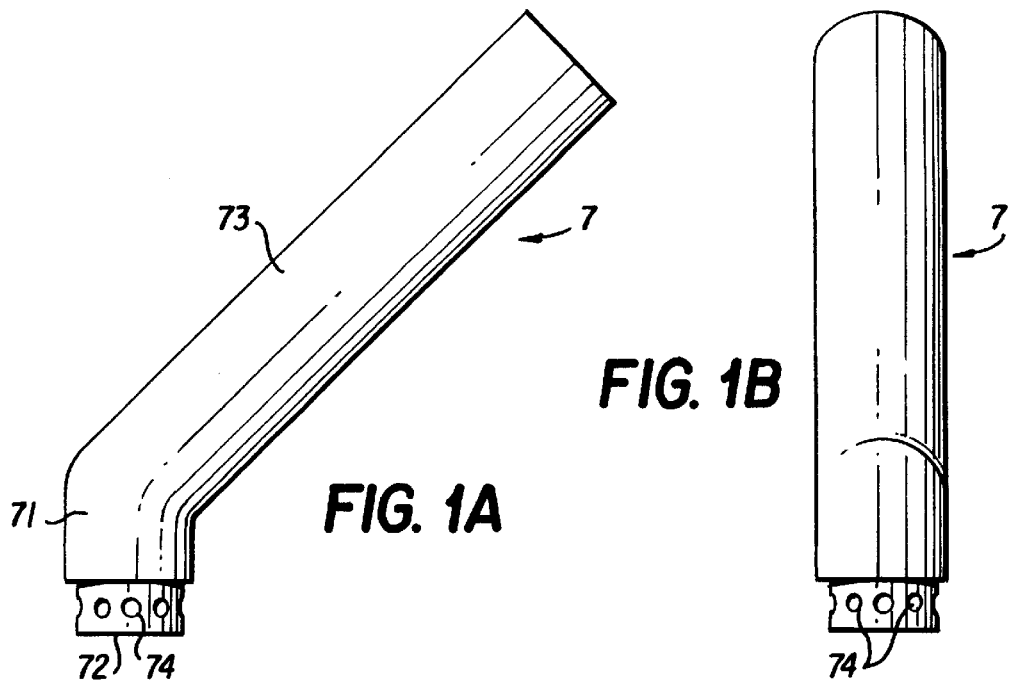
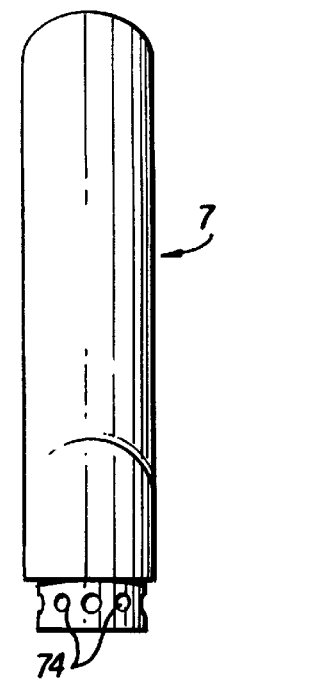
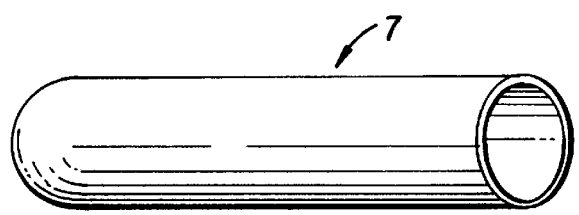
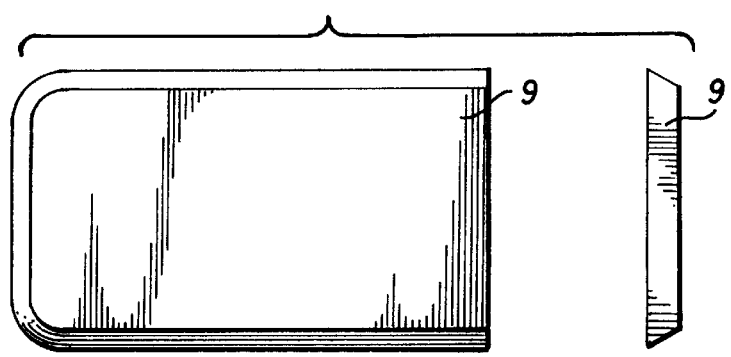

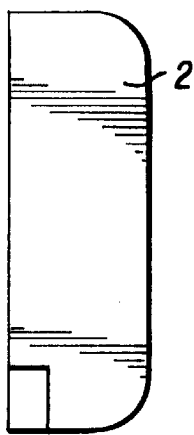
FIG. 4A FIG. 4B
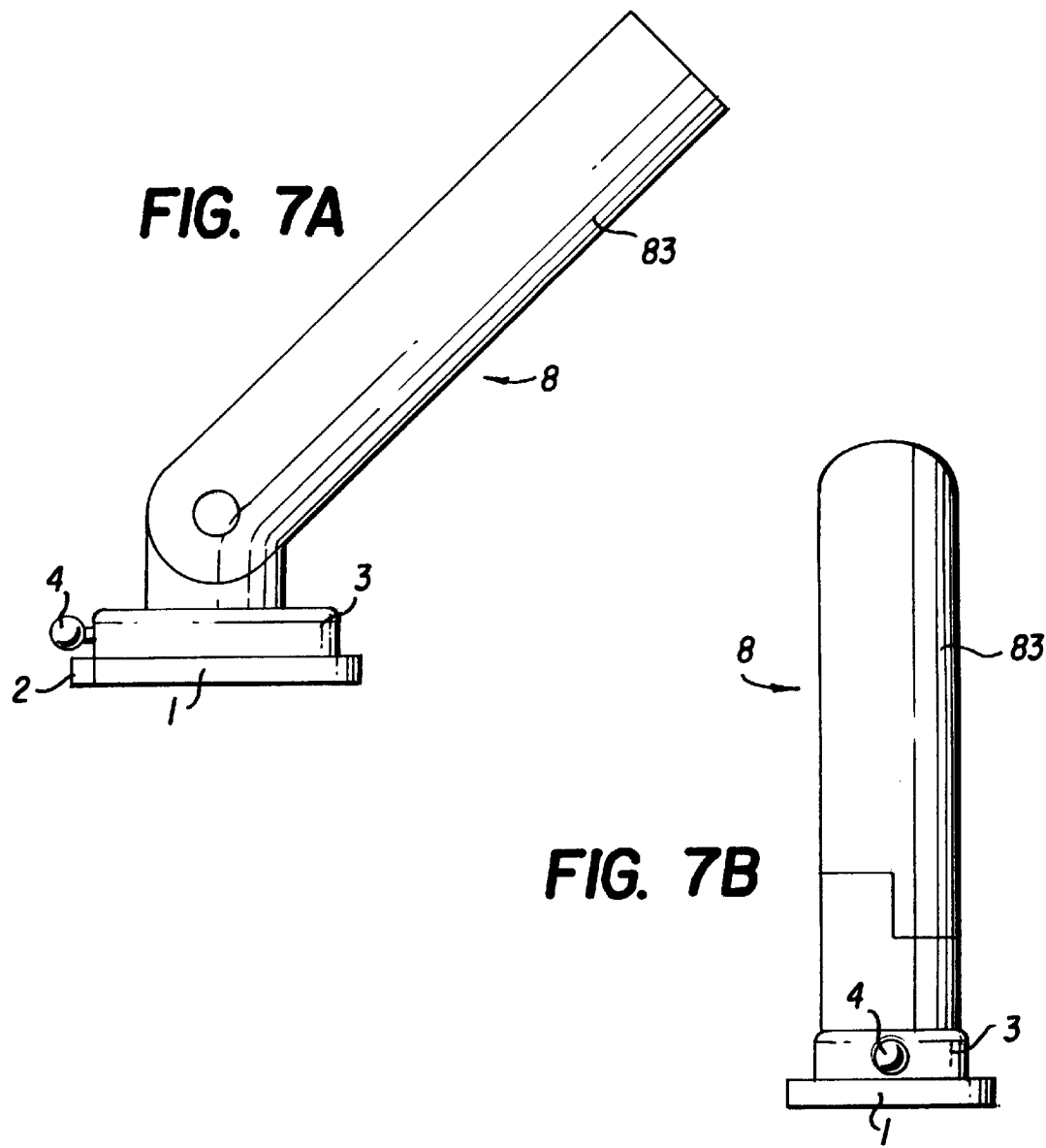
FIG. 7A
FIG. 7B

SWIVELLING, QUICK-LOCKING FISHING-ROD HOLDER

FIELD OF THE INVENTION

The present invention relates to the field of boat accessories with particular reference to the accessories necessary for practising trolling.

BACKGROUND OF THE INVENTION

Trolling, as known, has been developing very much in recent years involving even more people. In such a development, trolling spread also to circles which had been always considered out of such a sport. Particularly, it is more and more frequent to see pleasure crafts provided with trolling equipment and accessories and often destined for users very demanding as far as fitting out more than sport and touring is concerned.

A particularly interesting example regarding the present invention is the so-called fishing-rod holder which is used for correctly supporting the fishing-rod during fishing and is generally secured to the boat's side.

Fishing-rod holders of the known type are currently formed of a plate secured to the boat's side by screws and provided at the upper side with a cylindrical sleeve which is the real holder and supports the handle of the fishing-rod keeping it in the right fishing position. Among the fishing-rod holders, those fixed, i.e. not removable from the installation site, and those fixed or removable but provided with fishing-rod position adjustment means may be mentioned. In any case, all of the known fishing-rod holders have several problems firstly due to their cumbersome size, which is an useless hindrance and an obstacle on the surface of the boat especially when the fishing is out. Another problem still due to the impossibility of completely removing the fishing-rod holder is the easy deterioration and corrosion of the components, above all on the sea, with negative aesthetic, functional results.

Also the removable fishing-rod holders available on the market suffer from such problems. In fact, in order to connect the plate to a removable fishing-rod holder couplings usually formed of two members, the first one integral with a plate secured to the boat's side and projecting from the latter, the second one integral with the cylindrical sleeve receiving the fishing-rod, have been hitherto used. The couplings used in the already existing fishing-rod holders have either one or more operating positions in the case of swivelling fishing-rod holders. In the latter case, however, there is another sequence of problems due to the difficulty of setting the position of the fishing-rod. Actually, in order to set the position of the fishing-rod holding sleeve with respect to the fixed plate it is necessary: disassembling the coupling, reaching a different position defined, for example, by corresponding indentations or recesses formed in both coupled members, and coupling again such members by tightening them by screw means.

It is self-evident from the foregoing that the fishing-rod holders currently on the market both of the fixed and removable types having one or more fishing positions do not solve a series of problems, i.e. that of easily and quickly allowing the fishing-rod to swivel and that of riding the boat's deck or side of any useless hindrance when the equipment is not used.

Accordingly, in the field of application of the present invention there is still a demand of fishing-rod holders for trolling which can satisfy "professional" users and are at the same time aesthetically agreeable and compatible with a tourist use of the boat.

In the light of the preceding considerations the present invention seeks to get around the described drawbacks and to provide quick-locking fishing-rod holders which can be snap-adjusted in one or more planes and wholly removed from the surface of installation.

SUMMARY OF THE INVENTION

Such a result is achieved by the present invention by providing a fishing-rod holder for trolling which is generally formed of an anchor plate to which a plate supporting the base of the cylindrical fishing-rod holder is removably secured, for example, by a dovetail joint.

According to the invention the base of the cylindrical holder can rotate with respect to the plate in the horizontal plane and is provided with means for adjusting to and quickly locking in the reached position.

A further feature of the invention provides that the position of the cylindrical fishing-rod holder may be also adjusted in the vertical plane by resorting to a further quick-locking adjustment device acting between the base of the cylindrical fishing-rod holder and the same cylindrical holder.

Finally, once removed the plate with the cylindrical fishing-rod holder, the anchor plate may be covered by applying a lid so that a small hindrance as well as an upper nice-looking surface not impeding the boat occupiers may be achieved.

The obtained advantages essentially consist in that a fishing-rod holder of such a design easily and quickly allows the fishing position of the fishing-rod to be adjusted and locked without tools according to one or more adjustment planes.

A second advantage consists in that, when not in use, the fishing-rod holder may be easily removed without leaving hindrance parts and without being exposed to the corrosive action of the weather, salty wind etc.

A third advantage is the better aesthetic effect assured by the flat form of the plate and the covering lid, once removed the fishing-rod holder.

A fourth advantage is the possibility of easily changing several plates supporting the different models of fishing-rod holders.

BRIEF DESCRIPTION OF THE DRAWINGS

These and other advantages will be better understood by anyone skilled in the art from the following description with reference to the accompanying not limiting drawings in which:

FIGS. 1A–1C show a first embodiment of a cylindrical fishing-rod holder according to the present invention in side, front and plan views, respectively;

FIGS. 4A–4B show a side closure means of the anchor plate of FIGS. 2A–2C in plan and side views, respectively;

FIG. 5 shows an exploded view of the quick-locking means which the plate of FIGS. 2A–2C is provided with;

FIGS. 6A–6B show a covering lid of the plate of FIGS. 3A–3C in plan and side views, respectively;

FIGS. 7A–7C show a second embodiment of a fishing-rod holder according to the present invention comprising the plate of FIGS. 2A–2C and the plate of FIGS. 3A–3B in side, front and plan views, respectively;

DETAILED DESCRIPTION OF THE PREFERRED EMBODIMENTS

In its essential construction with reference to the annexed drawings a fishing-rod holder according to the invention includes: a plate 1, a plate 3, a cylindrical fishing-rod holder 7 and a first quick-locking means.

Figure 3A:
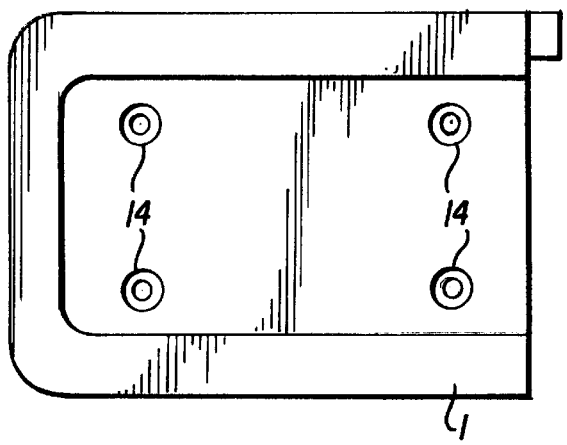
FIGS. 3A–3B show a plate for anchoring the plate of FIGS. 2A–2C in plan and side views, respectively.
Figure 3B:
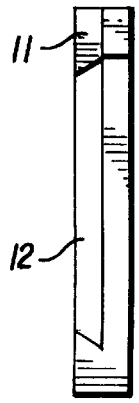
Figure 7C:
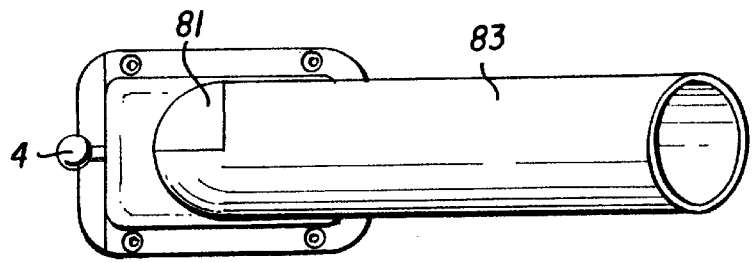

The plate 1 is shown in FIGS. 3A–3B and provided with several holes 14 for receiving the anchor screws, the upper part of said plate 1 being formed of a frame 11 which is provided with upwards converging inner edges so as to form a dovetail joint 12.

Figure 2A:
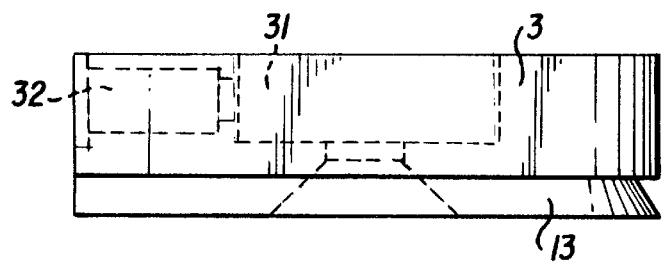
FIGS. 2A–2C show a removable plate for locking and adjusting in the horizontal plane a cylindrical fishingrod holder according to the present invention in side, front and plan views, respectively.
Figure 2C:
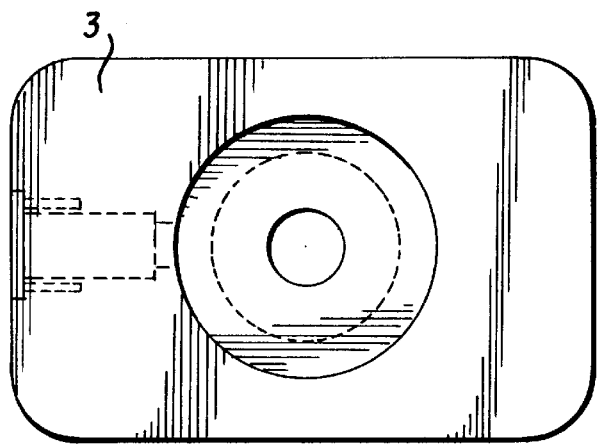
Figure 2B:
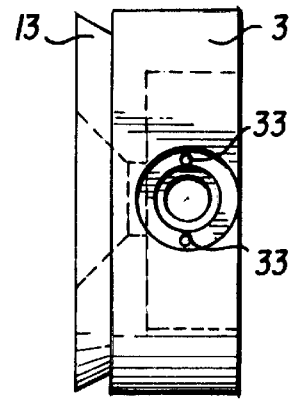

The plate 3 which may be seen in FIGS. 2A–2C and is provided at the lower side with a base 13 having a dovetail shape corresponding to the size of dovetail joint 12. Furthermore, plate 3 has an upper cylindrical cavity 31 and a lateral through hole 32 radially located with respect to cavity 31. As can be particularly seen from FIG. 2A, hole 32 is formed of three lengths of decreasing diameters, the innermost of which leads into cavity 31 and the outermost of which is shaped like a ring having two side threads 33 for small screws. As seen in FIGS. 3A–3B, the frame 11 of plate 1 is designed such that the dovetail joint engages a portion of a perimeter of the base 13. However, the frame 11 also defines an open side for slidably passing the base 13 therethrough. Thus, the base 13 may be slid into and out of the frame 11 through the open side of the frame 11.

The cylindrical fishing-rod holder 7 is provided with a lower part 71 formed of a vertical section having an end diameter at the most equal to the diameter of cavity 31 of plate 3 and being provided with a crown of equidistant holes 74 having a diameter equal to or slightly greater than that of the innermost length of hole 32. At the upper part the cylindrical fishing-rod holder 7 is formed of an inclined section 73 having a greater length than the lower section and receiving the handle of the fishing-rod.

The first quick-locking means comprises: a pin 4 having the same diameter as the holes 74 and being provided with an abutting ring 41 at a distance from the free end of pin 4 greater than the innermost length of hole 32. At the other end, pin 4 is provided with an outer thread engaging a knob 42; a lock washer 5 having the same size as the outermost ring-shaped length of hole 32 and such a width as to partially shut the middle length. Lock washer 5 is further provided with two through holes 51 corresponding to the side threads 33; a helical spring 6 having an inner diameter slightly greater than the diameter of pin 4 and being a little longer than the middle length of hole 32.

Before assembling the whole holder it is necessary to assemble first of all the locking means described above into plate 3.

Such operation is carried out by inserting in succession into hole 32 pin 4 without knob 42, spring 6, and lock washer 5, and finally by screwing the threaded knob 42 at the outer end of pin 4. In order to shut hole 32 and to compress spring 6 it is sufficient that side threads 33 correspond to holes 51 of lock washer 5 and the latter is tightened to plate 3 by suitable screws. By such an arrangement spring 6 is compressed between lock washer 5, now integral with plate 3, and ring 41 which is thus forced inwardly so that the free end of pin 4 is caused to project into cavity 31.

Once secured plate 1 to the boat, the first assembling operation of the holder consists in that base 13 of plate 3 is caused to slide into the corresponding dovetail joint 12 of plate 1. Thereafter, in order to finish the installation of the fishing-rod holder it is sufficient pulling pin 4 outwardly against spring 6, inserting the lower crown 72 of the cylindrical fishing-rod holder 7 into cavity 31, and rotating it until one of the holes 74 coincides with the free end of pin 4. By releasing knob 42, pin 4 is pushed inwardly until the cylindrical fishing-rod holder 7 is locked in its position.

Finally, in order to finish the assembling and to protect the inner parts of the holder it is also provided that a lid 2 shown in FIGS. 4A–4B closes the sides of plate 1.

In a second preferred embodiment shown in FIGS. 7A–7C and 8A–8C there is provided a cylindrical fishing-rod holder 8 the upper and lower parts 81, 83 of which are no longer rigidly connected to each other. The upper part is linked to the lower part so that the inclination of the cylindrical fishing-rod holder can be also adjusted according to a vertical plane.

Figure 8A:
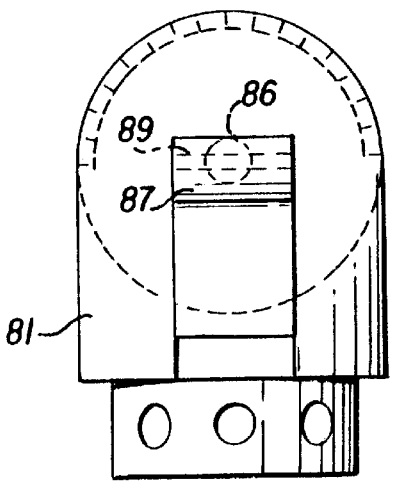
FIGS. 8A–8C show the adjustment means of the cylindrical fishing-rod holder of FIGS. 7A–7C in the vertical plane according to the present invention in front and side views, respectively.
Figure 8B:
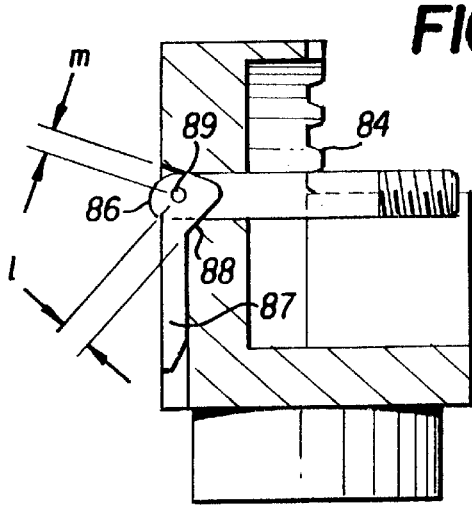
Figure 8C:
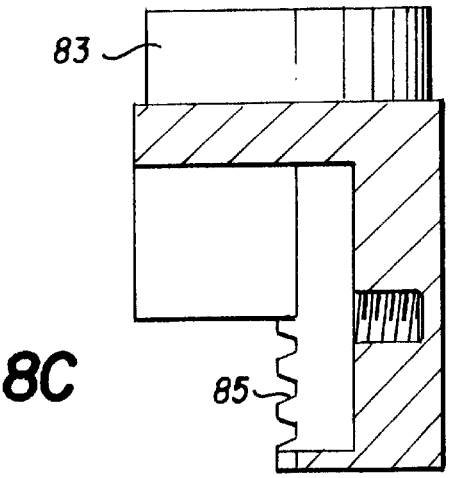

As can be particularly seen from FIGS. 8A–8C, such a link is formed of a coupling of two semicircular racks 84 and 85 provided in the lower 81 and upper 83 parts of the cylindrical fishing-rod holder 8, respectively. Rack 85 can rotate with respect to the fixed rack 84 about a pin 86 which can axially slide in the lower part 81 and engage with its thread a corresponding thread formed in the upper part 83. The axial sliding of pin 86 and then the shift of rack 85 integral therewith with respect to rack 84 is assured by a cam lever 87 connected to pin 86 by a plug 89 and having two steady positions with respect to a cooperating surface 88 of the fixed part 81. The racks 84, 85 are located in an annular region at a perimeter of the lower 81 and upper 83 parts, respectively.

FIG. 8B shows the closure position of lever 87 in which the distance l between the cooperating surface 88 and plug 89 integral with pin 86 is such as to keep racks 85 and 84 in the engaging position. In order to release the two racks and to adjust the inclination of the cylindrical fishing-rod holder 8, lever 87 is rotated upwards so that the cam thereof reaches the second steady position in which the distance m between surface 88 and the axis of plug 89 is lower, thus allowing the moving part 83 to be shifted from the fixed part 81 to such an extent as to disengage the respective racks 85 and 84.

Once reached the desired inclination, the position of fishing-rod holder 8 is fixed by bringing lever 87 to its lowered closure position again, thus providing, in combination with the adjustment relative to plate 3 in the horizontal plane, a double adjustment which allows the best fishing position of the fishing-rod to be quickly and easily selected by the fisherman.

Referring now to FIGS. 4 and 6, both described embodiments make use of a lid 9 to be applied to the dovetail joint 12 disengaged from plate 3 after the latter is removed when the fishing-rod holder is not used.

It is self-evident from the features of the present invention described above that the fixed parts of the fishing-rod holder have an even, not hindering surface, thus avoiding any obstacle besides providing a nice-looking aspect for the boat sides concerned.

In addition, according to a further advantageous feature of the invention, the fishing-rod holder may be removed by easily releasing a joint connection, thus allowing a simple replacement and maintenance and the protection against the weather corrosion.

The present invention is described with reference to a preferred embodiment but it should be understood that equivalent modifications may be made by those skilled in the art without departing from the scope of the present industrial invention and then remaining within the limits of protection granted thereto.

I claim:

1. A fishing-rod holder for trolling, comprising an anchor plate (1) forming a dovetail joint with a support plate (3) supporting a cylindrical fishing-rod holder (7, 8), said anchor plate forming a frame to engage a portion of a perimeter of the support plate to form the dovetail joint, said frame defining a frame open side for sliding the support plate therethrough, said cylindrical fishing-rod holder being provided with means (4–6; 86–89) for adjusting and quickly locking the position thereof according to one or more planes, wherein said plate (3) is provided at the lower side with a base (13) having a dovetail shape corresponding to the size of dovetail joint (12) and has an upper cylindrical cavity (31) and a lateral through hole (32) which is located radially to cavity (31), said hole (32) being formed by three lengths of decreasing diameter, one of said lengths being an innermost length, and another of said lengths being an outermost length, and another of said lengths being a middle length which is located between said innermost and outermost lengths, each said lengths being aligned with each said other length, the innermost length leads into the cavity (31) and the outermost length is shaped like a ring having two parallel side threads 33 for small screws.

2. Fishing-rod holder according to claim 1, wherein said anchor plate (1) is provided with several holes (14) for inserting locking screws, the upper part of said anchor plate being formed of said frame (11) with inner edges converging upwards to form said dovetail joint (12).

3. Fishing-rod holder according to claim 2, wherein said frame has a top plate surface and said frame inner edges and said frame top plate surface define an acute angle.

4. Fishing-rod holder according to claim 1, wherein said adjusting and quick-locking means (4–6) operate in a horizontal plane and are formed of the following elements: a pin (4) aligned in a horizontal direction having at the most the same diameter as the holes (74) and being provided with an abutting ring (41) at a distance from the free end of pin (4) greater than the innermost length of hole (32), pin (4) being provided at the other end with an outer thread engaging an operating knob (42); a lock washer (5) having the same size as the outermost ring-shaped length of hole (32) and such a width as to partially shut the middle length of hole (32), and being further provided with two through holes (51) corresponding to the side threads (33); a helical spring (6) having an inner diameter at least equal to the diameter of pin (4) and being a little longer than the middle length of hole (32).

5. Fishing-rod holder according to claim 1, wherein said fishing-rod holder is made of stainless material.

6. Fishing-rod holder according to claim 1, wherein said cylindrical fishing-rod holder (8) is formed of a lower part (81) and an upper part (83) linked to each other by two semicircular racks (84) and (85), rack (85) being able to rotate with respect to the other rack about a common pin (86) which can axially slide in the lower part (81) of said cylindrical fishing-rod holder (8) and has a threaded end to be engaged into a corresponding thread of the upper part (83) of said cylindrical fishing-rod holder (8).

7. Fishing-rod holder of claim 1, wherein the diameter of the outermost length is larger than the diameter of the middle length which is larger than the diameter of the innermost length.

8. A fishing-rod holder for trolling, comprising an anchor plate (1) forming a dovetail joint with a support plate (3) supporting a cylindrical fishing-rod holder (7, 8), said anchor plate forming a frame to engage a portion of a perimeter of the support plate to form the dovetail joint, said frame defining a frame open side for sliding the support plate therethrough, said cylindrical fishing-rod holder being provided with means (4–6; 86–89) for adjusting and quickly locking the position thereof according to one or more planes, wherein the lower part of said cylindrical fishing-rod holder is formed of a vertical length (71) ending in a crown (72) which has the same diameter as the cavity (31) and is provided with holes (74) having a diameter almost equal to that of the innermost length of hole (32), the upper part of the cylindrical fishing-rod holder (7) being formed of an inclined section (73) having a greater length than the lower part of the cylindrical fishing-rod holder (7) and receiving the handle of the fishing-rod.

9. A fishing-rod holder for trolling, comprising an anchor plate (1) forming a dovetail joint with a support plate (3) supporting a cylindrical fishing-rod holder (7, 8), said anchor plate forming a frame to engage a portion of a perimeter of the support plate to form the dovetail joint, said frame defining a frame open side for sliding the support plate therethrough, said cylindrical fishing-rod holder being provided with means (4–6; 86–89) for adjusting and quickly locking the position thereof according to one or more planes, wherein said cylindrical fishing-rod holder (8) is formed of a lower part (81) and an upper part (83) linked to each other by two semicircular racks (84) and (85), rack (85) being able to rotate with respect to the other rack about a common pin (86) which can axially slide in the lower part (81) of said cylindrical fishing-rod holder (8) and has a threaded end to be engaged into a corresponding thread of the upper part (83) of said cylindrical fishing-rod holder (8).

10. Fishing-rod holder according to claim 9, comprising second quick-locking means (86–89) operating in a vertical plane and formed of a lever (87) connected to pin (86) by a plug (89) and provided with a cam having a first steady state position and a second steady state position with respect to a fixed cooperating surface (88) of the lower part (81) of said cylindrical fishing-rod holder (8) wherein in the first steady state position the distance (1) between the axis of the plug (89) and the surface (88) is sufficient to keep the racks (84, 85) in engaging position, and in the second state steady position the distance between the axis of plug (89) and surface (88) is sufficient to disengage the racks (84, 85) from each other.

11. Fishing-rod holder according to claim 9, wherein said fishing-rod holder is made of stainless steel.

12. Fishing-rod of claim 9, wherein the semicircular racks have teeth projecting from respective annular semicircle surfaces contacting a respective perimeter defined respectively by the lower part (81) and the upper part (83).

13. A fishing-rod holder for trolling, comprising an anchor plate (1) forming a dovetail joint with a support plate (3) supporting a cylindrical fishing-rod holder (7, 8), said anchor plate forming a frame to engage a portion of a perimeter of the support slate to form the dovetail joint, said frame defining a frame open side for sliding the support plate therethrough, said cylindrical fishing-rod holder being provided with means (4–6; 86–89) for adjusting and quickly locking the position thereof according to one or more planes, comprising a counterplate (2) for a side closure and a lid (9) for sliding into the dovetail joint (12) of anchor plate (1) when the fishing-rod holder is not used to exhibit an outer even surface of small hindrance.

* * * * *